(12) United States Patent
Soulie

(10) Patent No.: US 10,623,965 B2
(45) Date of Patent: Apr. 14, 2020

(54) METHOD OF COMMUNICATING IN AN AD HOC NETWORK, TRANSMITTING/RECEIVING STATION AND ASSOCIATED COMPUTER PROGRAM

(71) Applicant: THALES, Neuilly sur Seine (FR)

(72) Inventor: Antoine Soulie, Gennevilliers (FR)

(73) Assignee: THALES, Neuilly sur Siene (FR)

( * ) Notice: Subject to any disclaimer, the term of this patent is extended or adjusted under 35 U.S.C. 154(b) by 450 days.

(21) Appl. No.: 14/362,338

(22) PCT Filed: Nov. 30, 2012

(86) PCT No.: PCT/EP2012/074165
§ 371 (c)(1),
(2) Date: Jun. 2, 2014

(87) PCT Pub. No.: WO2013/079703
PCT Pub. Date: Jun. 6, 2013

(65) Prior Publication Data
US 2014/0307633 A1    Oct. 16, 2014

(30) Foreign Application Priority Data
Dec. 2, 2011    (FR) .................................... 11 03693

(51) Int. Cl.
*H04W 84/12*    (2009.01)
*H04W 16/26*    (2009.01)
(Continued)

(52) U.S. Cl.
CPC ........... *H04W 16/26* (2013.01); *H04W 4/029* (2018.02); *H04W 4/06* (2013.01); *H04W 72/048* (2013.01); *H04W 72/005* (2013.01); *H04W 84/18* (2013.01)

(58) Field of Classification Search
CPC ... H04W 16/26; H04W 84/18; H04W 72/005; H04W 4/02
(Continued)

(56) References Cited

U.S. PATENT DOCUMENTS

2008/0009308 A1    1/2008 Bar et al.
2009/0016262 A1*   1/2009 Kulkarni ............... H04W 24/08
                                                370/328
(Continued)

FOREIGN PATENT DOCUMENTS

EP          2 141 945        1/2010

OTHER PUBLICATIONS

A novel geocasting protocol for multi-interface tactical Ad Hoc Networks.*
(Continued)

*Primary Examiner* — Charles C Jiang
*Assistant Examiner* — Voster Preval
(74) *Attorney, Agent, or Firm* — Troutman Sanders LLP

(57) ABSTRACT

The invention relates to a method for communicating between nodes of an ad hoc network including a database matching geographical zones and radio channels, at least one respective radio channel, called geographical radio channel, being selectively associated with each geographical zone in the database: detection, by at least one node, of its location; determination, by said node, of at least one geographical zone within which it is located, based on the detected location, and determination of at least one geographical radio channel selectively associated with said determined geographical zone; transmission and/or reception by said node of data to be relayed between nodes of the ad hoc network on said geographical radio channel thus associated with it.

12 Claims, 3 Drawing Sheets

(51) Int. Cl.
  *H04W 4/029* (2018.01)
  *H04W 72/04* (2009.01)
  *H04W 4/06* (2009.01)
  *H04W 72/00* (2009.01)
  *H04W 84/18* (2009.01)

(58) Field of Classification Search
  USPC .......................................................... 370/328
  See application file for complete search history.

(56) References Cited

U.S. PATENT DOCUMENTS

| | | | | |
|---|---|---|---|---|
| 2009/0175223 A1* | 7/2009 | Hall | ...................... | H04L 12/189 370/328 |
| 2009/0298523 A1* | 12/2009 | Ogawa | .................. | H04W 72/04 455/509 |
| 2009/0310514 A1* | 12/2009 | Jeon | ...................... | H04W 36/12 370/254 |
| 2009/0323654 A1 | 12/2009 | Nagata et al. | | |
| 2013/0099941 A1* | 4/2013 | Jana | ...................... | H04W 4/023 340/905 |
| 2017/0026897 A1* | 1/2017 | Hanson | .............. | H04B 7/15535 |

OTHER PUBLICATIONS

Erdal Cayirci, et al. "Application of 3G PCS Technologies to Rapidly Deployable Mobile Networks" 2002, IEEE Network, vol. 16, No. 5, pp. 20-27.

International Search Report dated Jan. 21, 2013, from corresponding International Application No. PCT/EP2012/074165.

Tseng, Yu-Chee et al. "An architecture for power-saving communications in a wireless mobile ad hoc network based on location information" 2004, Microprocessors and Microsystems, vol. 28, pp. 457-465.

Sun-Joong Yoon, et al. "A Novel Geocasting Protocol for Multi-interface Tactical Ad Hoc Networks" 2011 Third International Conference on Ubiquitous and Future Networks (ICUFN), pp. 208-213.

* cited by examiner

METHOD OF COMMUNICATING IN AN AD HOC NETWORK, TRANSMITTING/RECEIVING STATION AND ASSOCIATED COMPUTER PROGRAM

CROSS-REFERENCE TO RELATED APPLICATIONS

The present application is the National Stage of International Application No. PCT/EP2012/074165 filed Nov. 30, 2012. The International Application claims priority to French Application No. 11/03693 filed Dec. 2, 2011. The International Application Published as WO 2013/079703 on Jun. 6, 2013. All of the above applications are incorporated by reference herein.

FIELD OF THE INVENTION

The present invention relates to radio communications between nodes of an ad hoc network.

BACKGROUND

In a known manner, an ad hoc network has no fixed infrastructure, and has stations equipped with a radio transmitting and/or receiving means and appropriate protocols form the nodes of the network and communicate with each other using one or more shared radio channels.

Ad hoc networks are in particular used to carry out tactical communications between military teams moving over combat zones. For example, each team has a radio transceiver station that constitutes a node of the network. Several teams are generally grouped together in groups, the teams within a same group for example falling under a same hierarchical commander.

There are two types of communication needs within such an ad hoc network: communications reserved for teams in the same established group and generally pertaining to hierarchical services; these communications are transmitted and received by nodes of the same group and can only pass through nodes in that group; and communications relative to geographical services, which in particular depend on the proximity of the nodes and not the group to which a node belongs. Below, the terms geographical or cross communications or messages refer to those communications or messages that are relayed based solely on geographical proximity, and not membership in a group.

One problem encountered in tactical communications is the low capacity of each radio channel (for example, a VHF radio channel has a width of 25 kHz), which limits the capacity of the ad hoc network and therefore the number of nodes that can be implemented therein, or which limits the services that can be rendered to them.

A first solution to resolve this problem is to increase the width of a channel, for example by increasing it to 75 kHz for a VHF channel, which makes it possible to increase the available throughput for the geographical services.

A second solution to resolve this problem is to use different 25 kHz channels non-simultaneously, for unique communication purposes, i.e., internal, within each group. The number of nodes in each group is limited. Each group has a channel dedicated to it during only a fraction of the radio frame. Different groups can use different 25 kHz channels at the same time, which makes it possible to increase the overall throughput and services rendered. In order to allow shared communication by all groups, a shared gateway channel must be established on another fraction of the frame.

The main drawback of the first solution lies in its shorter range, at an equivalent power, which consequently requires redeveloping new protocol and networking layers to take advantage of the increased bandwidth. This first solution thus does not make it possible to resolve the maintenance of the range and widening of the throughput for cross communications simultaneously.

The main drawback of the second solution lies in the lack of capacity of the gateway channel that is necessary for geographical services based on the geographical proximity of the communicating nodes and which can therefore correspond to communications between nodes in a same group or nodes in different groups. This second solution makes it possible to increase the throughput for group communications, but does not make it possible to increase the throughput for cross communications.

The present invention aims to make it possible to increase the available resources for cross communications.

SUMMARY

Thus, according to a first example, the invention proposes a method for communicating between nodes of an ad hoc network including radio communication means, said method being characterized in that it includes the following steps, said nodes further including localization means and storage means of a database matching geographical zones and radio channels, at least one respective radio channel, called geographical radio channel, being selectively associated with each geographical zone in the database detection, by at least one node, of its location via said localization means; determination, by said node, of at least one geographical zone within which it is located, based on the detected location, and determination of at least one geographical radio channel selectively associated with said determined geographical zone; association of said determined geographical radio channel with said node; transmission and/or reception by said node of data to be relayed between nodes of the ad hoc network on said geographical radio channel thus associated with it.

The present invention makes it possible to increase the transmission capacities for cross communications of an ad hoc network.

In examples, the invention further has one or more of the following features nodes having been distributed in the groups, at least one respective radio channel, called group radio channel, is also allocated exclusively to the radio transmission and/or reception of the nodes of each respective group; said node signals the presence of the group on said geographical radio channel; said node retransmits data on said group channel to be relayed between nodes of the ad hoc network, not reserved for the group of said node and that it received on a geographical channel associated with said determined geographical zone; said node retransmits data on said geographical channel to be relayed between nodes of the ad hoc network not reserved for the group of said node and that it received on a geographical channel associated with said determined geographical zone and/or that it received on a group channel allocated to the group of said node; a group including nodes distributed in separate geographical zones, when several of said nodes are located in a same geographical zone, the retransmission, on the geographical channel of said same zone, of data received on the group channel of said group is done exclusively by the node situated closest to the center of said same geographical zone; when a same group includes nodes in areas overlapping several zones, the channel associated with each of said zones is associated with at least one of said nodes; and geographically adjacent geographical zones stored in the database are associated with distinct respective geographical radio channels.

According to another example, the invention proposes a transmitting/receiving station suitable for forming a node of an ad hoc network, including radio communication means, localization means and storage means of a database, said transmitting/receiving station being characterized in that the database matches geographical zones and radio channels, at least one respective radio channel, called geographical radio channel, being selectively associated with each geographical zone in the database, said transmitting/receiving station further being suitable for detecting its location via said localization means; determining at least one geographical zone within which it is located, based on the detected localization; and determining at least one geographical radio channel selectively associated with said determined geographical zone;

said transmitting/receiving station further being suitable for transmitting and/or receiving data to be relayed between nodes of the ad hoc network, on said determined geographical radio channel.

According to a further example, the invention proposes a computer program to be installed in a transmitting/receiving station suitable for forming a node of an ad hoc network, said program comprising instructions for carrying out the following steps when the program is run by the processing means of said station: detecting the location of the station; determining at least one geographical zone within which said station is located, based on the detected localization and a database stored by the station, matching geographical zones and radio channels, at least one respective radio channel, called geographical radio channel, being selectively associated with each geographical zone in the database; and determining at least one geographical radio channel selectively associated with said determined geographical zone; transmitting and/or receiving data to be relayed between nodes of the ad hoc network, on said determined geographical radio channel.

BRIEF DESCRIPTION OF THE DRAWINGS

Other features and advantages of the invention will appear upon reading the following description. This description is purely illustrative and must be read in light of the appended drawings, in which.

DETAILED DESCRIPTION

Figure 1:
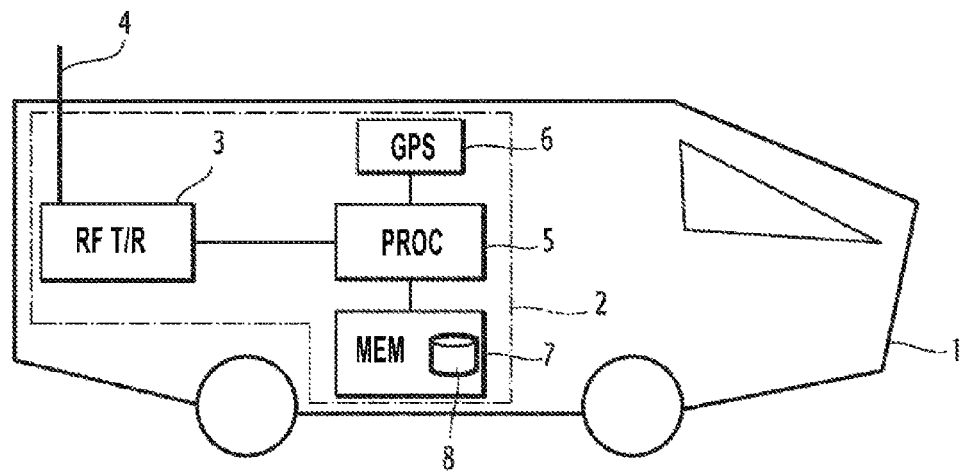
FIG. 1 is a view of a node of an ad hoc network implementing a method according to an example of the invention.

FIG. 1 shows an armored vehicle 1 provided with a transmitting/receiving station 2 designed to form a node 2 of an ad hoc network.

A node 2 includes a processing module 5, a GPS module 6 and a memory 7.

The memory 7 includes a database 8.

The processing module 5 is suitable for controlling the operation of the different components of the node 2 and in particular includes a microcontroller on which software stored in memory 7 is run.

In order to exchange signal frames with a neighboring node by means of a shared radio channel, a node 2 further includes a radiofrequency transmitting/receiving radiofrequency module 3 connected to an antenna 4.

The radio module 3 includes a media access control (MAC) layer, a physical Baseband layer, a physical radiofrequency layer. The radio module 3 is suitable, under the control of the processing unit 5, for receiving and processing a radiofrequency signal coming from the antenna 4, or allowing the development and transmission of a radiofrequency signal from the antenna 4.

In one example, the signals exchanged are according to protocol IEEE 802.11 or non-standardized protocols in force in the military radio communications field, and for example include voice communication data, messages of the SMS, MMS or instant messaging type.

In the considered example, the radio module 3 is suitable for operating, under the control of the processing module 5, in half-duplex communication mode.

Figure 2:
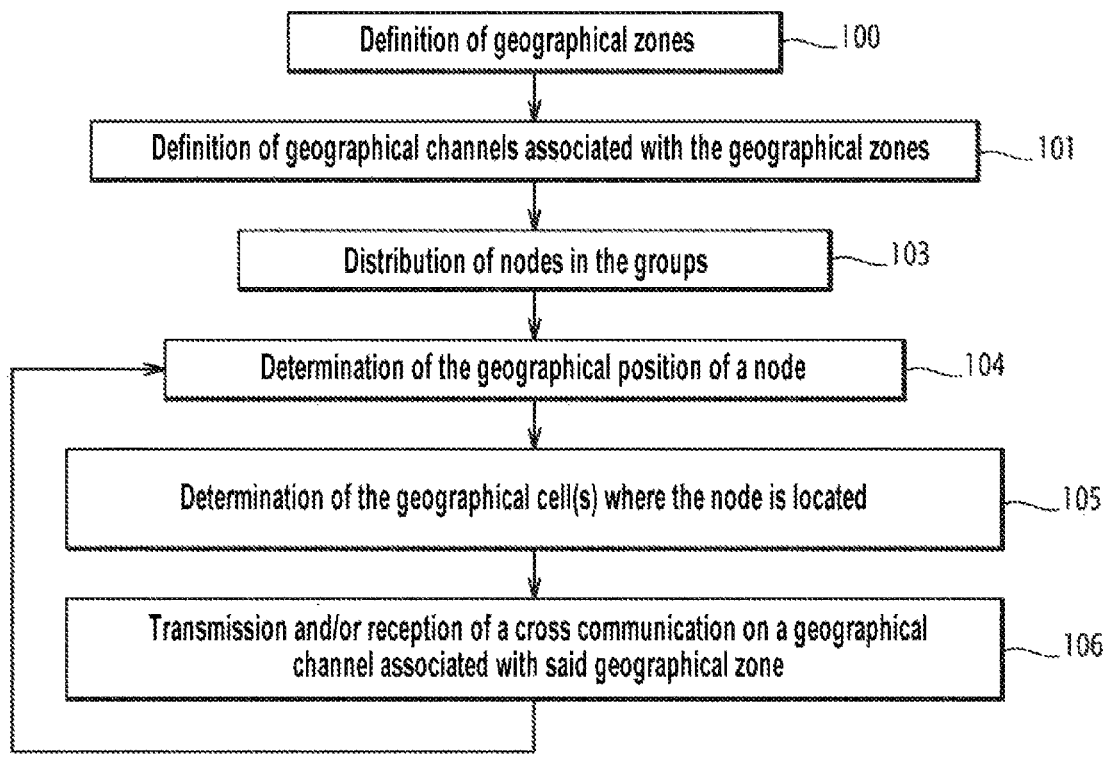
FIG. 2 is a flowchart of a method in an example of the invention.

In reference to FIG. 2, in one example of the invention, the following steps are carried out.

At least some of these steps, in particular those carried out within a node, are done following the execution, on the microcontroller of the processing module 5 of the node, of corresponding software instructions stored in memory 7.

In a step 100, geographical zones are defined on at least one zone Z corresponding to part of the geographical surface that may be occupied by vehicles making up nodes of an ad hoc network. These nodes are similar to the node 2 shown in FIG. 1.

In one example, some of these geographical zones are adjacent or partially overlapping.

In step 101, a radio channel is defined for each of these geographical zones. Such a radio channel is called geographical radio channel. Two adjacent or overlapping geographical zones are allocated a distinct channel.

To carry out these steps 100, 101, for example, a computer is used to determine the size, position and channel allocated to each of the cells based on the average range of the radio module 3 used in a node 2 (typically 15-20 km).

Figure 5:
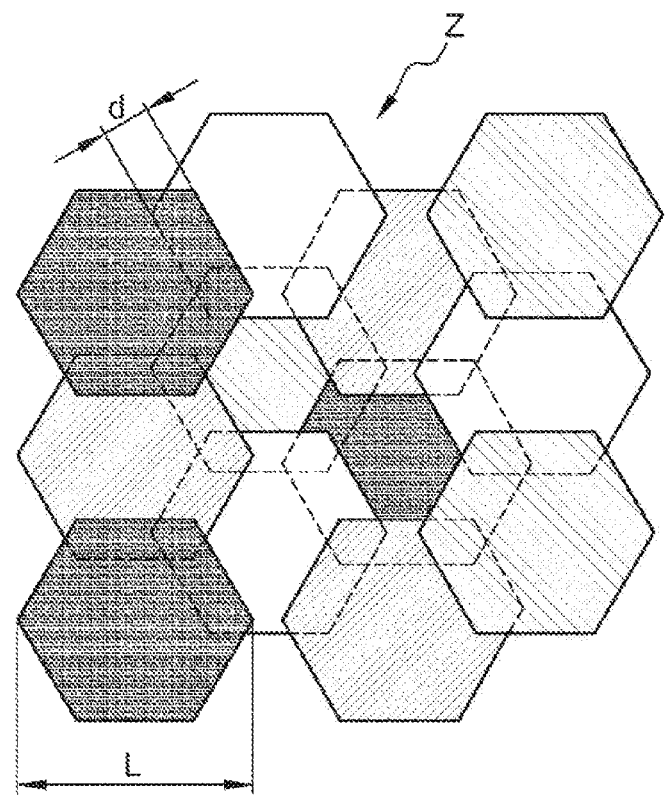
FIG. 5 is a view of geographical cells in another example of the invention.

For example, the zone Z is broken down into hexagonal cells, arranged such that a partial overlap between 3 cells is obtained, as shown in FIG. 5. In the case of FIG. 5, the overlap has a length equal to 4 km and a same geographical channel is allocated to cells including the same filling type in FIG. 5.

The breakdown of the zone Z into cells, as well as the geographical channel allocated to each of those cells, are downloaded in the database 8 of the memory 7 of each of the nodes 2. In another example, the algorithm and the parameters making it possible to determine the breakdown and/or allocation are stored in the memory 7 of the node 2.

In a step 103, an operator determines the makeup of the groups. Each vehicle, and thus each node, is allocated to a group. The correspondence between the different nodes/vehicles and the groups is stored in the database 8 of each node 2. It will be noted that this step 103 can be carried out before step 101 and/or step 100. A distinct group radio channel is allocated to each group. The communications reserved for a group are transmitted and received only on the channel for that group (changes in group channel allocations may of course be done relative to a group).

All of steps 104 to 106 are next carried out regularly by each of the nodes.

In a step 104, the node 2 determines its current geographical position using its GPS module 6 and stores it in its database 8.

Based on that geographical position thus determined, and the definition of the geographical cells stored in its database 8, the node 2 determines the geographical cell(s) within which it is located, in a step 105.

When it is located within several geographical cells, it selects one of them based on criteria that can be varied, and some of which are proposed below.

Then, in a step 106, during a cross communication to be done in reception and/or transmission, the node 2 receives and/or transmits that cross communication on the associated geographical channel, in the database 8, to said determined geographical and, if applicable, selected cell.

In particular, if the node 2 must transmit data outside its group, it will preferably use that geographical channel inasmuch as nodes from another group have been signaled on that geographical channel.

Steps 104 to 106 are reiterated, at regular intervals (for example, every 15 minutes), and also following movements of the node 2 or movements of nodes in the same group and/or other groups.

Figure 3:
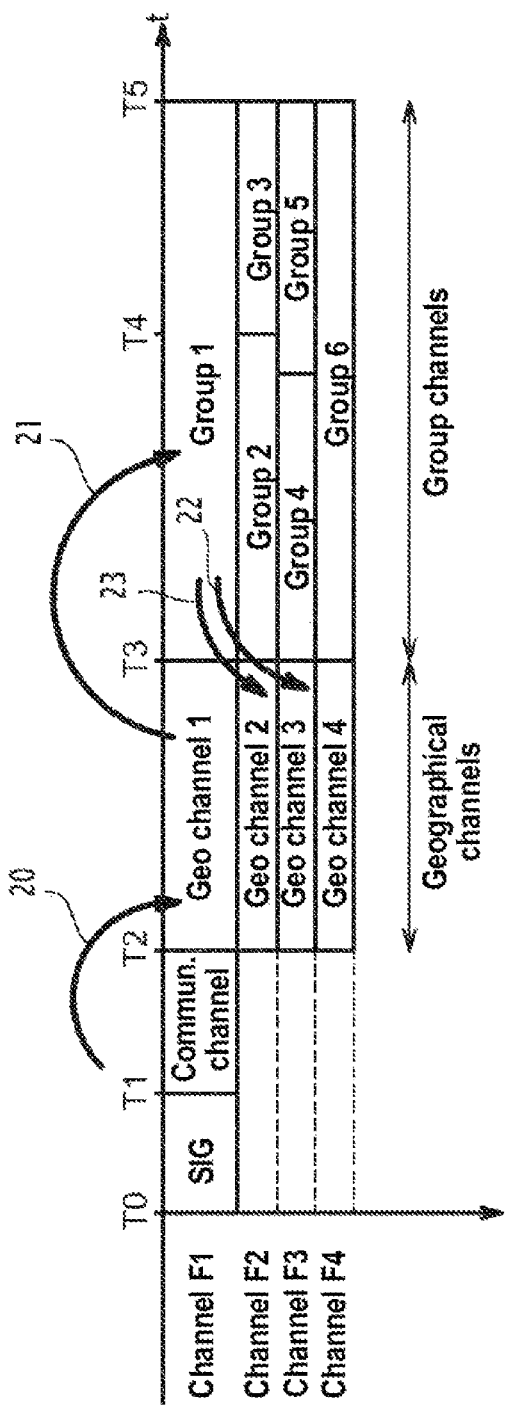
FIG. 3 is a view of the time and frequency distribution of the communication of the nodes relative to different radio channels.

FIG. 3 shows a plan for allocating radio channels in one example of the invention and a time cycle for use of those radio channels by the nodes, in particular based on their geographical position in the group to which they belong.

The horizontal axis represents the time axis. A communication cycle implemented by each node 2 elapses between T0 and T5, corresponding to the duration of a radio frame.

Four distinct radio channels are considered: channel F1, channel F2, channel F3, channel F4. Each of these channels is a VHF channel, with a width of 25 kHz. They are disjointed. The allocation of these channels is distributed over time in various signal, group, geographical, shared channels.

Thus, it will be noted that a signal channel SIG corresponds to a period T0-T1 of a cycle on channel F1 and a shared channel corresponds to a period T1-T2 of a cycle on channel F1.

Furthermore, a geographical channel no. 1 corresponds to the T2-T3 period of radio channel F1, a geographical channel no. 2 corresponds to the T2-T3 period of radio channel F2, geographical channel no. 3 corresponds to the T2-T3 period of radio channel F3, and geographical channel no. 4 corresponds to the T2-T3 period of radio channel F4.

The group channel allocated to group no. 1 of nodes corresponds to the T3-T5 period of channel F1 and the group channel allocated to group no. 6 of nodes corresponds to the T3 to T5 period of channel F4.

The group channel allocated to group no. 4 of nodes corresponds to the T3-T4 period of channel F2, while the group channel allocated to group no. 3 of nodes corresponds to the T4-T5 period of channel F2.

The group channel allocated to group no. 4 of nodes corresponds to the T3-T4 period of channel F3, while the group channel allocated to group no. 5 of nodes corresponds to the T4-T5 period of channel F3.

Thus, each node 2 is suitable, during a frame, for implementing signal exchanges on the SIG channel, during the T0-T1 period. It is also suitable for implementing cross communication if necessary, in reception and/or transmission on the shared channel, during the T1-T2 period.

Each node 2 is further suitable for implementing cross communications, in transmission and/or reception, on the determined geographical channel based on its geographical position, during the T2-T3 period.

Furthermore, each node 2 is further suitable for carrying out cross communications, in transmission and/or reception, on its group channel, during all or part of the T3-T5 period, depending on the groups.

In the considered example, the radio module 3 of a node 2 operates in half-duplex, for each of the SIG channels, shared channel, geographical channel and group channel.

Furthermore, the access to the geographical and/or group channels is in accordance with a protocol based on multiple access in CSMA or TDMA, or CDMA, FDMA or OFDMA. In one example, orthogonal radio channels are allocated to geographical channels, and the transmissions are done in OFDMA both on group channels and geographical channels, orthogonal to each other in the frequency domain.

Thus, the use of geographical channels, in addition to the use of the shared channel when it exists, makes it possible to increase the throughput of the cross communications.

Different implementing situations of the invention are discussed below.

In these situations, it is considered that on its group channel, each node transmits its currently determined position, and consequently that on its group channel, each node receives current position information for other nodes in its group.

Figure 4:
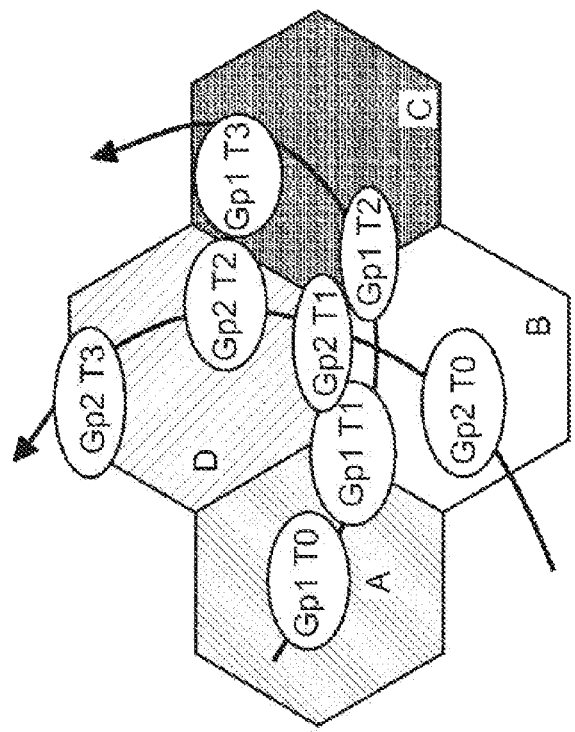
FIG. 4 is a view of nodes in geographical cells in a further example of the invention.

FIG. 4 shows 4 geographical cells A, B, C, D resulting from a step similar to step 100. Each of these geographical cells A, B, C, D is associated, during a step similar to step 102, with a geographical channel no. 1, no. 2, no. 3 and no. 4, respectively.

The placements are considered, at different moments T0, T1, T2 and T3, of two groups of moving nodes: group no. 1, referenced Gp1 in FIG. 4, and group no. 2, referenced Gp2 in FIG. 4, each associated with a respective group channel.

The distribution of the radio resources is for example that illustrated in FIG. 3 and outlined below.

The nodes in the same group can communicate with each other at all times using the group channel associated with the group, optionally by successive hops between intermediate nodes situated within radio range of one another, in particular for hierarchical communications.

In the context of necessary cross communications, for example, a message originally transmitted by a node from a given group at a given geographical point signals the presence of the vehicle on which that node is located at that given geographical point. Such a message must be sent to all of the nodes of all of the groups situated N km around the given point (for example N is equal to 5 km), for example to prevent that vehicle, which may be unmarked, from being identified as a target by the other vehicles with ad hoc nodes on board. The message also indicates that geographical target range of the message.

At moment T0, group Gp1 is located in cell A, while group Gp2 is located in cell B. The nodes in group Gp1, during the T2-T3 period of each cycle, use the geographical channel 1 associated with cell A in transmission/reception. In particular, at least one node from group Gp1, or even each node from group Gp1, is signaled as being representative of group no. 1, present on that geographical channel.

Similarly, the nodes in group Gp2 during the T2-T3 period of each cycle use the geographical channel 2 associated with cell B in transmission/reception. In particular, at least one node from group Gp2, or even each node from group Gp2, is signaled as being representative of group no. 2, present on that geographical channel.

Since the nodes in group 1 did not detect the presence of nodes from other groups while listening to geographical channel no. 1, the nodes in group no. 1 have determined that only their group was in cell A.

Likewise, since the nodes in group 2 did not detect the presence of nodes from other groups when they listened to geographical channel no. 2, the nodes in group no. 2 determined that only their group was in cell B.

Since no node from a group other than group Gp1 is present on channel no. 1, when a cross message is then communicated by group Gp1, group channel no. 1 is used to relay that cross message between the nodes in group Gp1, while the message is also propagated by one or more nodes from group Gp1 using the shared channel to the other nodes in another group.

Similarly, since no node from a group other than group Gp2 is present on channel no. 2, when a cross message is then communicated by group Gp2, group channel no. 2 is used to relay that cross message between the nodes in group Gp2, while the message is also propagated by one or more nodes from group Gp2 using the shared channel to the other nodes in another group.

In order to determine whether such a message received by a node requires relaying, that node verifies whether it has already received and relayed it. If yes, it does not relay the message again. If no, the node compares its own geographical position with the range indicated by the message (example: radius of N km around a geographical point of origin), and if its own position is contained within the range, it propagates the message to other nodes, via the group channel to the nodes in its group, and via its geographical channel or the shared channel to other nodes.

At moment T1, group Gp1 is simultaneously located on cells A, B and D and shares cells B and D with group Gp2. Cross communications will therefore be possible between the two groups by means of each of the geographical channels associated with the cells within which different groups are present.

Thus, at least one node from group Gp1 located in cell A is allocated to a geographical communication on channel no. 1, at least one node from group Gp1 located in cell B is allocated to a geographical communication on channel no. 2, and at least one node from group Gp1 located in cell D is allocated to a geographical communication on channel no. 4. Similarly, at least one node from group Gp2 situated in cell B is allocated to a geographical communication on channel no. 2 and at least one node from group Gp2 situated in cell D is allocated to a geographical communication on channel no. 4. The nodes perform a broadcast on the geographical channel allocated to them, indicating at least the group to which they belong.

Thus, each node needing to relay a cross message received on its group channel, will, if applicable, relay that message by transmitting it on its geographical channel, if a node from another group is present on that same geographical channel (typically in the case at hand, the nodes having channel no. 2 or no. 4 as geographical channel). Likewise, each node needing to relay a cross message received on its geographical channel will relay that message, if applicable, by transmitting it on its group channel.

In such a case, the cross communications between nodes of a different group are done via the geographical channels, while the group channel is used to relay a cross message from one geographical cell to another geographical cell: in fact, a message received on the group channel of a node in group Gp2 associated with cell D is transmitted by that node on channel no. 4 and received by a node in group Gp1 also associated with cell D. The latter node in turn relays the message on its group channel. Thus, it is received by a node in group Gp1 associated with cell B, which can in turn transmit it on geographical channel no. 2, to which a node in group Gp2 is in particular listening, etc.

At moment T2, group Gp1 is present on cells B and C, while group Gp2 is present only on cell D. The cross communication between these two groups therefore cannot occur via a geographical channel and will be relayed between different groups via the shared channel.

At moment T3, group Gp1 is present on cells C and D, and group Gp2 is present on cell D. At least one node from each group Gp1, Gp2 that is present in cell D and associated with channel no. 4 is signaled to the node of the other group present on that same channel.

The cross communications between groups Gp1 and Gp2 are thus done via that geographical channel no. 4.

In one example, the geographical cells overlap. This arrangement makes it possible to avoid that two neighboring groups implement cross communications using geographical channels, the two neighboring groups being each situated in a distinct cell and whereof the nodes are for example located less than 50 m from each other. In such an example, once a group is located in an overlapping Zone, a node from that group must be allocated to each of the overlapping cells (this measure is relevant when a node has no capacity to receive several geographical channels simultaneously; if a node has the capacity to receive several geographical channels simultaneously, then it can receive communications taking place in the adjacent cells. Only its transmission channel changes based on its position. If all of the nodes have this capacity, then they can all listen to the channels of adjacent cells, even if they do not overlap).

Figure 6:
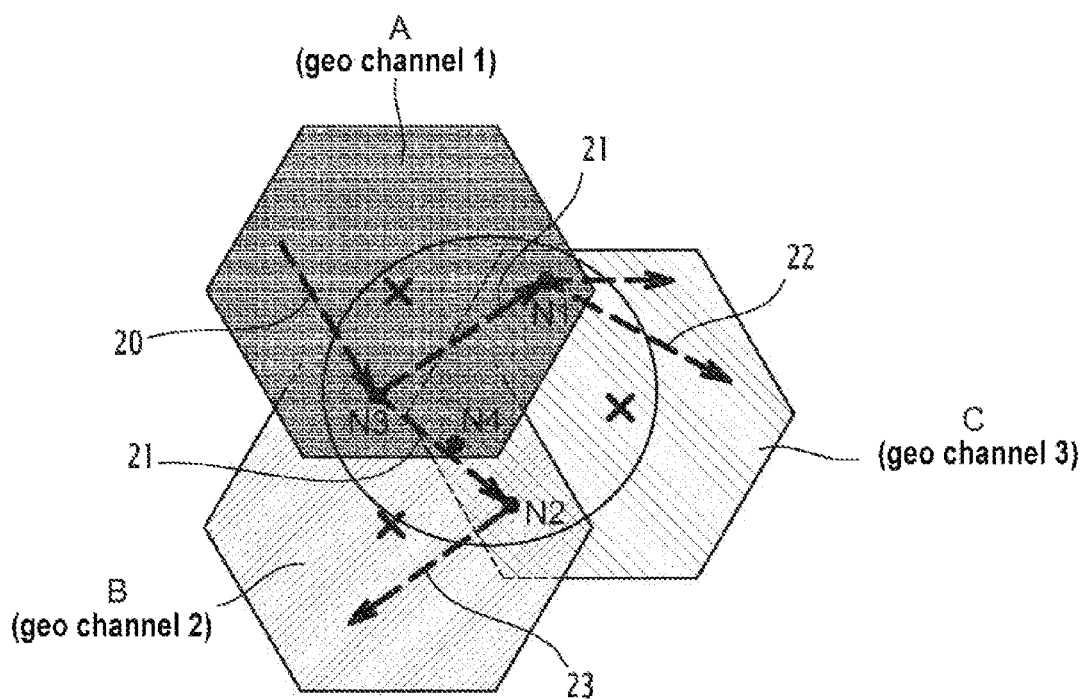
FIG. 6 is a view of nodes in geographical cells in embodiment yet further example of the invention.

In reference to FIG. 6, group no. 1 includes nodes distributed in the three cells A, B, C each associated with a geographical channel, namely geographical channel no. 1, no. 2 and no. 3, respectively.

The node N1 is in cells A and C, node N2 in cells B and C, node N3 in cells A and B, and node N4 in cells A, B, C.

Rules are considered to select the cell to which a node must be allocated when the node is located in an overlapping zone of two cells.

First, at least one node from group 1 situated in cell A must be associated with geographical channel no. 1. Likewise, a node in group 1 situated in cell B must be associated with geographical channel no. 2 and a node from group 1 situated in cell C must be associated with geographical channel no. 3, in order to allow the cross exchanges between cells A, B and C via the group channel.

Furthermore, the node in group 1 closest to the center (identified by an x in FIG. 6) of each cell is identified.

Thus, the node N3 being closest to the center of cell A from among the nodes N1, N3, N4, node N3 is allocated to geographical channel no. 1 of cell A.

Node N4 being closest to the center of cell B from among N2, N3 and N4, it is allocated to geographical channel no. 2. Node N1 being closest to the center of cell C from among N1, N2 and N4, it is allocated to geographical channel no. 3.

Node N2 is allocated to the geographical channel of cell B, since N4 is less central in cell B than N1 is in cell C. N2 can therefore replace N4 if necessary.

The references of the arrows indicated below pertain to FIGS. 3 and 6.

If a geographical message is received by node N3 on geographical channel no. 1 (see arrow 20), then it relays that message via the channel of its group (arrow 21) to the other nodes in the group. Each other node then relays it via the geographical channel allocated to it: node N1 on geographical channel no. 3 (arrow 22), node N4 on geographical channel no. 2 (arrow 23) (see also node N2 or not, if a rule is to relay a message received via a given group channel only once on a geographical channel of a cell).

In the considered example, a node is suitable for not sending a message back on its group channel that it received on the group channel. If the message received on the group channel is a cross message, the node transmits on the geographical channel, inasmuch as a node from another group has been signaled as being present on the geographical channel.

Thus, the message is sent once on the group channel and once on the geographical channel of each cell A, B, C, therefore only 4 times in all.

It will be noted that the implementation of geographical cells with partial overlapping, as for example shown in FIG. 5, makes it possible to implement cross communications on these geographical channels, without requiring relaying by a group channel, over a distance corresponding to the overlap distance (4 km, in the case of FIG. 5).

In one example of the invention implementing such a cellular configuration, for example that shown in FIG. 5, a node, after determining its position and deducing its geographical cell, is suitable for carrying out the following steps:

a/ If the node does not belong to any group or is not in radio range of its group, or if the number of nodes in its group is below the maximum number of geographical cells overlapped by a same cell (that number is for example defined in step 100 during the construction of the geographical cells; it corresponds to 3 in the case of FIG. 5, for example) (optionally: or if the maximum number of geographical cells overlapped by a same cell exceeds the number of distinct cells overlapping one another in which nodes of the considered group are located), then it uses a shared channel to conduct its cross communications, and thus will be heard by any node in geographical proximity.

b/ If the node is part of a group including nodes in a number exceeding or equal to the maximum number of overlapped geographical cells and for which it knows the position on a recent date (obtained via an exchange by the group channel) (and optionally: if the maximum number of geographical cells overlapped by a same cell is indeed equal to the number of distinct cells overlapping one another in which nodes from the considered group are found), then:

i/ if the node proves to be closest, from among the nodes in the group, to the center of one of the geographical cells in which it is located, then it selects the channel corresponding to that cell as geographical channel, it identifies itself on that geographical channel and uses that channel to transmit its cross communications thereon;

ii/ if it is not the closest, from among the nodes in the group, to the center of one of the geographical cells in which it is located, then it selects one of those cells, and only conducts listening on the geographical channel allocated to that selected cell (no transmission is done on that geographical channel), so as to be informed of the nodes of other groups located thereon.

c/ If that node is part of a group of several nodes and if it does not necessarily know a recent position of each of those nodes, then:

if the number of nodes for which it knows the recent position is greater than the maximum number of overlapped cells, the node carries out step b.ii.

If the number of nodes for which it knows the recent position is below the maximum number of overlapped cells, the node carries out steps b.i.

The present invention makes it possible to increase the transmission capacities for cross communications between different nodes not all simultaneously located on the same channel, by using several transmission channels simultaneously. In particular, the geographical channels allow cross communications between nodes from different groups, inasmuch as those groups each comprise at least one node situated in the same geographical cell.

An ad hoc network of the prior art uses a shared channel to exchange a geographical message every T seconds, between 200-300 nodes, the message being transmissible in one cycle.

Excluding spatial reuse of the spectrum (such spatial reuse being unlikely in VHF), the load of the channel is equal to Nb_pins×duration_slot/T. Using T=60 s, the duration of a "duration_slot" cycle being equal to 1 s for example, and the number of nodes Nb_pins being equal to 60, the load is equal to 60×1/60=100/100, or 100%.

By implementing the invention, the load of the channel may be estimated in each cell of the virtual cellular network, on the condition that a frequency orthogonalization of the cells is possible. The hypothesis is used that at least 3 channels are available.

With hexagonal cells of L=15 km long (see FIG. 5) and a maximum number of nodes 15 per cell (corresponding to approximately one joint services tactical sub-unit, or JSTSU, per cell) with nodes of 5 km on either side (the overlap distance corresponds to the size of the area of interest of each node), the overlap surface corresponds to 20% of the surface of the cell for each of the 2 surfaces. The number of nodes to be considered is therefore increased by 40%.

The maximum load of the channel of the cell is equal to 15×140%×duration_slot/T, or 35%.

A factor 3 in terms of load can therefore be expected. This factor results in artificially increasing the capacity of a shared channel by a factor of 3.

If an ad hoc network of the prior art is considered based on TDMA technology and exclusively using the shared channel (50% of a frame dedicated to the shared channel) to relay cross communications, including 600 nodes, with a geographical message to be relayed every 30 s, and without spatial reuse: the load of the shared channel is equal to 60/30*1/50%=400%.

By implementing the virtual cellular solution according to the invention and using the following hypotheses: spectral orthogonality of the cells (no spectrum shortage), overlap area with width d equal to 4 km between cells, maximum density of 15 nodes per cell with a 20 km length; 40% of the frame dedicated to the geographical channel, 10% dedicated to the shared channel, 50% dedicated to the group channel and 1 group channel per logic channel, and 25% of the traffic relayed between cells (ratio of inner surface of the cell to overlap surface);

then:
   the direct load per cell is 15/30*1/40%=125%
   the indirect load per cell is 15/30*1/40%*25%=31%
   the load induced per group channel is 15/30*1/50%*25%=25%, which corresponds to a gain of a factor 2.5 (=400/(125+31)) in load for cross communications.

In the described example, "radio channel" refers to a radio communication resource, which can correspond to an allocation of a given radiofrequency for an unlimited time or only during a given time interval within a frame length as considered in the examples above.

In the example described above, the position of a node was determined using a GPS module associated with the node. Of course, the geographical position can be identified or estimated using any other means, for example using an onboard inertial unit.

The invention claimed is:

1. A method for communicating between nodes of an ad hoc network including radio communication means, said method comprises the following steps, the nodes of the ad hoc network further including localization devices and storage devices of a database matching geographical zones and radio channels, at least one respective radio channel, called geographical radio channel, being selectively associated with each geographical zone in the database:

detecting, by at least one of the nodes of the ad hoc network, of its location via said localization device;

determining, by the at least one of the nodes of the ad hoc network, of at least one geographical zone within which it is located, based on the detected location, and determination of at least one geographical radio channel selectively associated with said determined geographical zone;

associating said determined geographical radio channel with the at least one of the nodes of the ad hoc network;

at least one of transmitting or receiving by the at least one of the nodes of the ad hoc network of data to be relayed between the nodes of the ad hoc network on said geographical radio channel thus associated with it;

allocating exclusively at least one respective radio channel, called group radio channel, to the nodes having been distributed in groups, for at least one of transmitting or receiving of the nodes of each respective group;

retransmitting data by the at least one of the nodes of the ad hoc network on said group radio channel to be relayed between the nodes of the ad hoc network, not reserved for the group of the at least one of the nodes of the ad hoc network received on the geographical radio channel associated with said determined geographical zone; and when a same group includes nodes in areas in which several geographical zones overlap, the geographical radio channel associated with each of said geographical zones is associated with at least one of the nodes of the same group, wherein each node relays a cross message, received on the group radio channel of said node, by transmitting said cross message on the geographical radio channel if a node of another group is present on the same geographical radio channel, and wherein each node relays said cross message, received on the geographical radio channel, by transmitting said cross message on the group radio channel of said node.

2. The communication method according to claim 1, wherein the at least one of the nodes of the ad hoc network signals the presence of the group on said geographical radio channel.

3. The communication method according to claim 1, wherein the at least one of the nodes of the ad hoc network retransmits data on said geographical radio channel to be relayed between the nodes of the ad hoc network not reserved for the group of the at least one of the nodes of the ad hoc network and that it received on the geographical radio channel associated with said determined geographical zone and/or that it received on a group radio channel allocated to the group of the at least one of the nodes of the ad hoc network.

4. The communication method according to claim 1, wherein a group includes nodes distributed in separate geographical zones, when several of the nodes of the group are located in a same geographical zone, the retransmission, on the geographical radio channel of said same zone, of data received on the group radio channel of said group is done exclusively by a node situated closest to the center of said same geographical zone.

5. The communication method according to claim 1, wherein geographically adjacent geographical zones stored in the database are associated with distinct respective geographical radio channels.

6. A transmitting/receiving station suitable for forming at least one of nodes of an ad hoc network, including a radio communication unit, a localization device and a storage device of a database, said transmitting/receiving station having the database match geographical zones and radio channels, at least one respective radio channel, called geographical radio channel, being selectively associated with each geographical zone in the database, said transmitting/receiving station further detecting its location via said localization device; determining at least one geographical zone within which it is located, based on the detected localization; and determining at least one geographical radio channel selectively associated with said determined geographical zone;

said transmitting/receiving station further transmitting and/or receiving data to be relayed between the nodes of the ad hoc network, on said determined geographical radio channel;

the nodes having been distributed in groups, at least one respective radio channel, called group radio channel, is also allocated exclusively to the radio transmission and/or reception of the nodes of each respective group;

suitable for retransmitting data on said group radio channel to be relayed between the nodes of the ad hoc network, not reserved for the group of the nodes and that it received on the geographical radio channel associated with said determined geographical zone; and when a same group includes nodes in areas in which several geographical zones overlap, the geographical radio channel associated with each of said geographical zones is associated with at least one of the nodes of the same group, wherein each node relays a cross message, received on the group radio channel of said node, by transmitting said cross message on the geographical radio channel if a node of another group is present on the same geographical radio channel, and wherein each node relays said cross message, received on the geographical radio channel, by transmitting said cross message on the group radio channel of said node.

7. The transmitting/receiving station according to claim 6, suitable for signaling the presence of the group on said geographical radio channel.

8. The transmitting/receiving station according to claim 6, suitable for retransmitting data on said geographical radio channel to be relayed between the nodes of the ad hoc network, not reserved for the group of said station and that it received on a geographical radio channel selectively associated with said determined geographical zone and/or that it received on a group radio channel allocated to the group of said station.

9. The transmitting/receiving station according to claim 6, suitable for retransmitting data on the geographical radio channel received on the group radio channel based on the result of the verification that the station is situated closest to the center of said same geographical zone relative to other nodes in the group of said station.

10. The transmitting/receiving station according to claim 6, geographically adjacent geographical zones stored in the database are associated with distinct respective geographical radio channels.

11. A non-transitory computer readable medium, to be installed in a transmitting/receiving station suitable for forming at least one of nodes of an ad hoc network, the non-transitory computer readable medium including a computer program comprising software instructions that, when carried out by a computer, implement the following steps:
   detecting the location of the station;
   determining at least one geographical zone within which said station is located, based on the detected localization and a database stored by the station, matching geographical zones and radio channels, at least one respective radio channel, called geographical radio channel, being selectively associated with each geographical zone in the database; and
   determining at least one geographical radio channel selectively associated with said determined geographical zone;
   transmitting and/or receiving data to be relayed between the nodes of the ad hoc network, on said determined geographical radio channel;
   determining at least one respective radio channel, called group radio channel, which is exclusive to nodes having been distributed in a group which includes the station, for at least one of transmitting or receiving of the nodes of the respective group;
   retransmitting data, received by the station on said at least one geographical radio channel associated with said determined geographical zone and not reserved for the group of the nodes, on said group radio channel to be relayed between the nodes of the ad hoc network; and
   when a same group includes nodes in areas in which several geographical zones overlap, the geographical radio channel associated with each of said geographical zones is associated with at least one of the nodes of the same group,
   wherein each node relays a cross message, received on the group radio channel of said node, by transmitting said cross message on the geographical radio channel if a node of another group is present on the same geographical radio channel, and
   wherein each node relays said cross message, received on the geographical radio channel, by transmitting said cross message on the group radio channel of said node.

12. A method for communicating between nodes of an ad hoc network including radio communication means, said method comprises the following steps, the nodes of the ad hoc network further including localization devices and storage devices of a database matching geographical zones and radio channels, at least one respective radio channel, called geographical radio channel, being selectively associated with each geographical zone in the database:
   detecting, by at least one of the nodes of the ad hoc network, of its location via said localization device;
   determining, by the at least one of the nodes of the ad hoc network, of at least one geographical zone within which it is located, based on the detected location, and determination of at least one geographical radio channel selectively associated with said determined geographical zone;
   associating said determined geographical radio channel with the at least one of the nodes of the ad hoc network;
   at least one of transmitting or receiving by the at least one of the nodes of the ad hoc network of data to be relayed between the nodes of the ad hoc network on said geographical radio channel thus associated with it;
   allocating exclusively at least one respective radio channel, called group radio channel, to the nodes having been distributed in groups, for at least one of transmitting or receiving of the nodes of each respective group;
   retransmitting data by the at least one of the nodes of the ad hoc network on said group radio channel to be relayed between the nodes of the ad hoc network, not reserved for the group of the at least one of the nodes of the ad hoc network received on the geographical radio channel associated with said determined geographical zone, and
   when a same group includes nodes in areas in which a plurality of the geographical zones overlap, each geographical radio channel associated with one geographical zone of the plurality of the geographical zones that overlap is associated with at least one of the nodes of the same group,
   wherein each node relays a cross message, received on the group radio channel of said node, by transmitting said cross message on the geographical radio channel if a node of another group is present on the same geographical radio channel, and
   wherein each node relays said cross message, received on the geographical radio channel, by transmitting said cross message on the group radio channel of said node.

* * * * *